United States Patent [19]

Laue et al.

[11] 4,081,511

[45] Mar. 28, 1978

[54] PROCESS FOR REMOVING NITRIC OXIDES FROM PROCESSING EXHAUST GASES

[75] Inventors: Karl Heinrich Laue, Hattingen; Theo Sander, Essen; Peter Sauder, Essen; Gotthard Uckert, Essen, all of Germany

[73] Assignee: Didier Engineering GmbH, Essen, Germany

[21] Appl. No.: 744,448

[22] Filed: Nov. 23, 1976

Related U.S. Application Data

[62] Division of Ser. No. 668,512, Mar. 19, 1976.

[30] Foreign Application Priority Data

Mar. 21, 1975 Germany .............................. 2512410

[51] Int. Cl.$^2$ ............................................. B01D 53/34
[52] U.S. Cl. .............................................. 423/239 A
[58] Field of Search ........................ 423/239, 351, 392

[56] References Cited

U.S. PATENT DOCUMENTS

| 2,975,025 | 3/1961 | Cohn et al. | 423/239 |
| 3,279,884 | 10/1966 | Nonnenmacher et al. | 423/239 |
| 3,467,492 | 9/1976 | Newman | 423/239 |
| 3,897,539 | 7/1975 | Fleming | 423/239 X |

FOREIGN PATENT DOCUMENTS

| 607,021 | 10/1960 | Canada | 423/239 |
| 1,504,331 | 10/1967 | France | 423/239 |

Primary Examiner—G. O. Peters
Attorney, Agent, or Firm—Wenderoth, Lind & Ponack

[57] ABSTRACT

Exhaust gases containing residual nitric oxide constituents from a processing operation are maintained at an elevated pressure, heated to from 260° to 340° C., and subjected to catalytic reduction with ammonia to produce purified exhaust gases. The pressure of the thus purified exhaust gases is then relieved in an expansion turbine.

7 Claims, 1 Drawing Figure

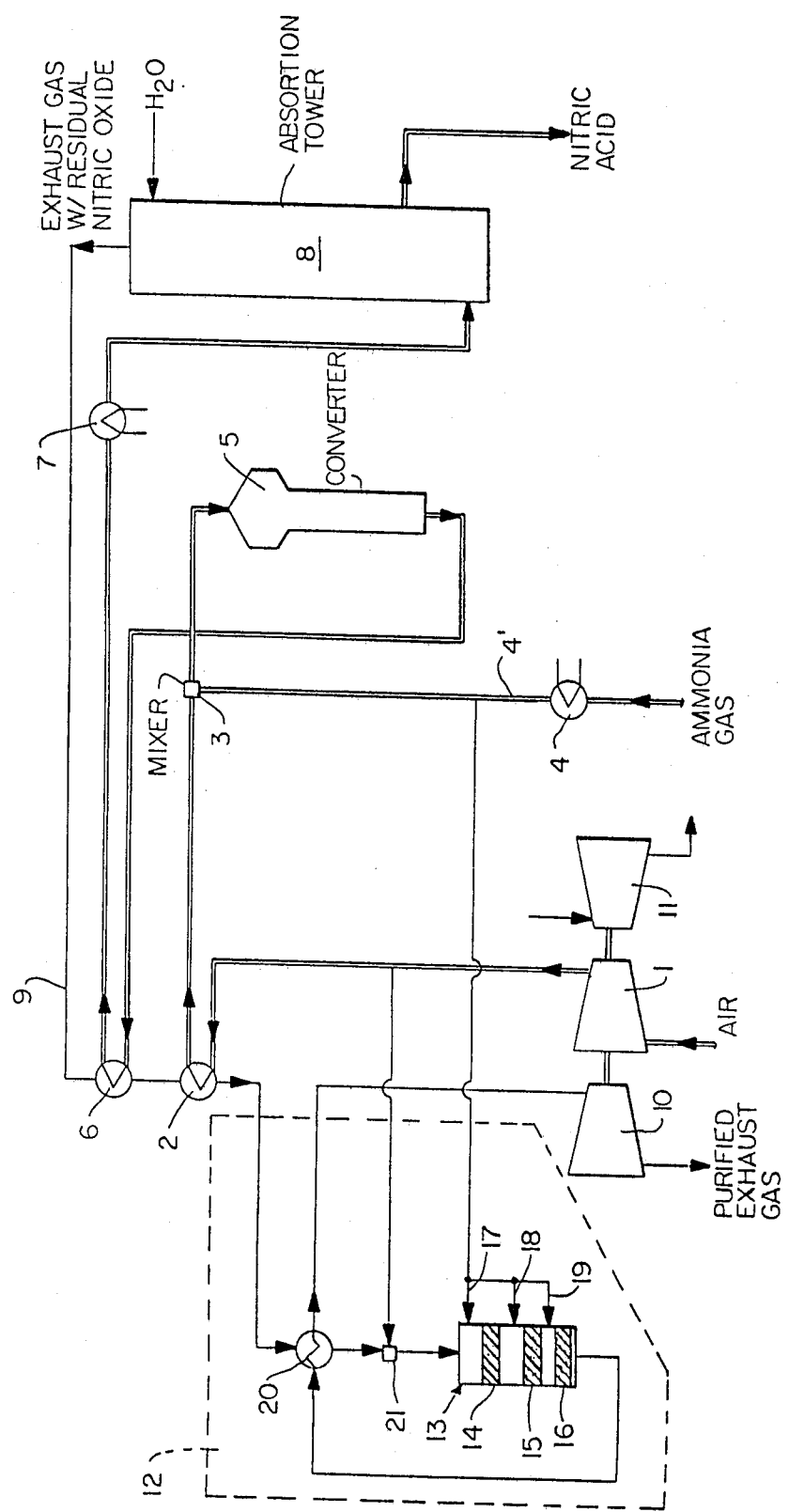

PROCESS FOR REMOVING NITRIC OXIDES FROM PROCESSING EXHAUST GASES

This is a division of application Ser. No. 668,512, filed Mar. 19, 1976.

BACKGROUND OF THE INVENTION

The present invention relates to a process for removing nitric oxide constituents from the exhaust gases of nitric-oxide processing installations, in particular nitric acid plants, through catalytic reduction with ammonia or ammonia-containing agents.

The emission of nitric oxides is detrimental to the environment. Accordingly, it is important to maintain within permissible limits the amount of nitric oxides emitted to the atmosphere in a process. Nitric acid plants ordinarily discharge nitric oxides in amounts which are far above normally permissible limits.

German Pat. No. 1,259,298 discloses a process wherein exhaust gas is treated after the primary processing operation, such as the production of nitric acid, and the purified exhaust gas is led directly to the atmosphere through a flue chimney.

SUMMARY OF THE INVENTION

The object of the present invention is to provide a system for removing nitric oxide constituents from the exhaust gas emitted in a conventional process employing nitrogen, such as the production of nitric acid, but wherein such system is included in the overall process in such a manner that additional expense for installation is kept low and the desired lowering of the nitric oxide concentration is obtained without exerting a substantial detrimental effect on the efficiency of the overall process.

This is achieved in accordance with the present invention by providing that the reduction of nitric oxides in the exhaust gas is undertaken at a stage of the overall process whereat the exhaust gas is under pressure. For example, in nitric acid plants the exhaust gas is discharged under pressure from an absorption system and is expanded, i.e. the exhaust gas pressure is relieved, in an expansion turbine, in order to recover energy from the process. The exhaust gas conventionally has an increased temperature, e.g. 180° C., in front of or upstream of the expansion turbine.

It is to be understood that the terms removal and reduction of nitric oxides as employed herein are intended to refer to the catalytic reduction with ammonia of gaseous nitrogen-oxygen compounds normally occurring in the exhaust gases of conventional processing operations such as those for the production of nitric acid. More specifically, the term nitric oxides as above defined is intended to refer to $NO_x$, wherein $x = 1$ or $2$.

It has now been unexpectedly discovered that the pressure of the exhaust gas during catalytic reduction thereof to remove nitric oxide therefrom not only exerts a positive effect on the catalytic reduction action, but also that it is possible to increase the maximally permissible catalyst load of the catalyst with increasing pressure. The reduction of the nitric oxides is preferably undertaken at a time or position wherein the exhaust gas is under a pressure of up to 12 atmospheres absolute. A preferred pressure range is from 2 to 5 atmospheres absolute. Optimal conditions may be achieved at given pressures within the above range when the temperature of the exhaust gas, prior to the reduction of the nitric oxides therein, is approximately from 260° to 340° C.

In order to attain a maximum reduction of nitric oxides with a minimum expenditure of reduction agents, the above temperatures, associated with the above pressures, were determined in a semi-industrial installation as well as in experimental installations. That is, when the temperature exceeds 340° C., the result is a substantial increase in usage and expenditure of the reduction agent due to resultant side reactions. If the temperature is below 260° C., then it is necessary to lessen the contact load, i.e. to lower gas flow and thereby the efficiency of the overall process, or the reduction of the nitric oxides is performed incompletely, which leads to an increase in the residual ammonia content of the exhaust gas, which likewise is undesirable.

The expense of providing the reduction agent can be reduced substantially if ammonia-containing gases or vapors are available in the overall process, e.g. in the form of solution gases from ammonia synthesis.

An installation according to the present for carrying out the above process in a nitric acid plant of the type having an expansion turbine for relieving the pressure of the exhaust gas includes, positioned upstream of the expansion turbine, a reactor formed by at least one catalyst bed wherein the exhaust gases are treated through the introduction of ammonia, and a heat exchanger positioned between the outlet and the inlet of the reactor to insure proper exhaust gas temperatures and to provide for efficient heat economy.

An installation of the above type may be employed in newly designed nitric acid plants and also may be incorporated in existing nitric acid plants. The pressure loss in the installation of the invention is sufficiently low that substantially no detrimental effect is exerted on the operation of the expansion turbine.

BRIEF DESCRIPTION OF THE DRAWING

Other objects and features of the present invention will be apparent from the following description taken with the accompanying drawing, wherein the single FIGURE is a schematic view of one example of the process of the present invention employed in an otherwise conventional nitric acid installation.

DETAILED DESCRIPTION OF THE INVENTION

With reference to the drawing a known nitric acid plant includes an air compressor 1 which conveys compressed air through a heat exchanger 2 into a mixer 3, to which gaseous ammonia is supplied through line 4' from an evaporator or vaporizer 4. The resultant mixture of air and ammonia reaches a converter 5 and is oxidized therein to nitric oxides, as is well known, and the reduction mixture therefrom is then passed through a heat exchanger 6 and a gas cooler 7 into an absorption tower 8, wherein necessary process water is added. The resultant nitric acid product therein obtained is removed from the lower portion of the absorption tower.

Exhaust gas, which includes residual nitric oxide, is discharged from the head of the absorption tower and is led through a pipe 9 and heat exchangers 6 and 2 into an expansion turbine 10, whereafter it is discharged into the atmosphere through an exhaust gas chimney.

In known nitric acid plants, the exhaust gas after leaving heat exchanger 2 is led directly to expansion turbine 10, expanded therein, i.e. the exhaust gas pressure is relieved, and led off through the chimney. Expansion turbine 10 produces a portion of the energy required by air compressor 1, and the remainder of the necessary compressor power or energy is provided by conventional means such as a steam turbine 11.

To the above otherwise conventional nitric acid plant is added the installation 12 of the present invention for reducing the nitric oxides in the exhaust gas. The system 12 is inserted between heat exchanger 2 and expansion turbine 10, and includes a reactor 13 wherein there is arranged a catalyst in at least one bed, e.g. in three beds 14, 15 and 16 placed one above another. Ammonia vapor is supplied through feed lines 17, 18, 19 from a suitable source, conveniently line 4', to spaces or chambers provided above catalyst beds 14, 15 and 16, respectively. Reactor 13 is connected on the inlet side thereof to heat exchanger 2 via a further heat exchanger 20, and if desired, an additional burner 21. Additional burner 21 may be operated, e.g. with a mixture of air and natural gas. Reactor 13 is connected at the outlet side thereof, through heat exchanger 20, to expansion turbine 10.

The operation of the system will be described further by way of the following example.

A flow of exhaust gas with residual nitric oxide, from the nitric acid production plant, passes from heat exchanger 2 at a flow rate of for example 20,000 Norm-m$_3$/h, at a temperature of for example 180° C., and at a pressure of for example 2.9 atmospheres absolute. The residual NO$_x$ concentration of the exhaust gas amounts for example to 2,500 ppm. The exhaust gas is heated in heat exchanger 20 to about 270° C. Additional burner 21 raises the temperature to 320° C. Approximately 42 kg/h gaseous ammonia is supplied to reactor 13. The distribution ratio of the gaseous ammonia to pipes 17, 18 and 19, is 70 : 20 : 10, and the ratio of the amounts of catalyst in catalyst beds 14, 15 and 16 is 15 : 20 : 65. The reaction between the residual nitric oxides in the exhaust gas and the ammonia is exothermal, and the thus generated heat of the purified exhaust gas passing from the outlet of reactor 13 is yielded in heat exchanger 20 to the exhaust gas coming from heat exchanger 2.

At the outlet of heat exchanger 20, the purified exhaust gas has a gas flow of 20,500 Norm-m$^3$/h, at a temperature of 180° C., and a pressure of 2.8 ata. The remaining residual NO$_x$ concentration is lower than 200 ppm. The purified exhaust gas is expanded, i.e. the pressure thereof is relieved, in connection with recovery of energy in the expansion turbine 10, and is then discharged through the flue chimney.

The scope of the present invention is not limited to the above specific example. Rather, installation 12 may be readily varied both with respect to construction and operation and can readily be adapted to the exhaust gas conditions of specific nitric acid plants. For example, additional burner 21 may be omitted if the exhaust gas entering reactor 13 possesses a suitably high temperature within the above mentioned range. A reactor including only two beds would also be sufficient in the above described example. Moreover, it is possible to purify exhaust gases wherein the concentration of residual nitric oxide is substantially higher or lower than in the above described example.

The catalyst may be conventional and preferably consists of a mixed oxide of iron oxide and chromium oxide and may be in granulated form.

It will be apparent that still further features of the invention may be modified without departing from the scope of the present invention.

What is claimed is:

1. A process for the simultaneous single-stage removal of NO$_2$ and NO from the exhaust gases of nitrogen-oxygen processing installations, particularly nitric acid production plates, said process comprising:

receiving NO$_2$ and NO containing exhaust gases from a processing installation at an elevated pressure of from 2 to 12 atmospheres absolute;

passing said exhaust gases through a heat exchanger and heating said exhaust gases therein to a temperature of from 260° to 340° C. while maintaining said exhaust gases at said elevated pressure;

providing a catalytic reactor separate from said heat exchanger and including plural separate catalyst beds connected in series, such that each said catalyst bed comprises a mixed oxide catalyst of iron oxide and chromium oxide, such that the quantities of said mixed oxide catalyst provided in each said catalyst bed are different, such that each said catalyst bed has an inlet side and an outlet side, and such that each said catalyst bed has at said inlet side thereof an enclosed chamber;

passing said heated and pressurized exhaust gases from said heat exchanger through the enclosed chamber of an upstream-most said catalyst bed, then through said upstream-most catalyst bed, and then serially through the remainder of the plural enclosed chambers and catalyst beds;

simultaneously supplying gaseous ammonia to all of said plural enclosed chambers to mix with the said exhaust gases therein and to thereby reduce NO$_2$ and NO in a single step from said exhaust gases during passage thereof through the respective said catalyst beds, the volumes of said gaseous ammonia supplied to said enclosed chambers being different and in inverse relation to the quantities of said mixed oxide catalyst of the respective said catalyst beds, such that the more of said mixed oxide catalyst in a given said catalyst bed, the less of said gaseous ammonia is supplied to the respective said enclosed chamber, and vice versa, whereby purified exhaust gases exit from the downstream-most catalyst bed, and the reduction of said NO$_2$ and NO producing exothermic heat which further heats said purified exhaust gases;

thereafter cooling said purified exhaust gases at a position separate from said catalytic reactor; and thereafter relieving the elevated pressure of the thus cooled purified exhaust gases.

2. A process as claimed in claim 1, wherein said elevated pressure is from 2 to 5 atmospheres absolute.

3. A process as claimed in claim 1, wherein said gaseous ammonia comprises ammonia-containing gas supplied from an ammonia synthesis operation.

4. A process as claimed in claim 1, wherein said step of cooling comprises passing said purified exhaust gases through said heat exchanger in heat exchange relation with said NO$_2$ and NO containing exhaust gases, thereby simultaneously performing said step of heating.

5. A process as claimed in claim 1, wherein said step of pressure relieving comprises passing said purified exhaust gases to an expansion turbine.

6. A process as claimed in claim 1, further comprising providing said mixed oxide catalyst in said plural catalyst beds in increasing quantities in the downstream direction of flow of said exhaust gases through said catalytic reactor.

7. A process as claimed in claim 6, further comprising supplying said gaseous ammonia to said enclosed chambers in decreasing volumes in said downstream direction of flow of said exhaust gases through said catalytic reactor.

* * * * *